US007778862B2

(12) United States Patent
Vaccarelli et al.

(10) Patent No.: US 7,778,862 B2
(45) Date of Patent: *Aug. 17, 2010

(54) CUSTOMER SATISFACTION SYSTEM AND METHOD

(75) Inventors: Vincent P. Vaccarelli, Westlake Village, CA (US); Barbara von Bergman, Palos Verdes Estates, CA (US)

(73) Assignee: Xerox Corporation, Norwalk, CT (US)

( * ) Notice: Subject to any disclaimer, the term of this patent is extended or adjusted under 35 U.S.C. 154(b) by 1339 days.

This patent is subject to a terminal disclaimer.

(21) Appl. No.: 11/034,128

(22) Filed: Jan. 12, 2005

(65) Prior Publication Data

US 2005/0216363 A1 Sep. 29, 2005

Related U.S. Application Data

(63) Continuation of application No. 10/083,263, filed on Feb. 25, 2002.

(51) Int. Cl.
*G06F 17/30* (2006.01)
(52) U.S. Cl. ..................................................... 705/10
(58) Field of Classification Search ................ 705/9, 705/10
See application file for complete search history.

(56) References Cited

U.S. PATENT DOCUMENTS

| | | | | |
|---|---|---|---|---|
| 5,493,692 | A | 2/1996 | Theimer et al. | 455/26.1 |
| 5,594,791 | A | 1/1997 | Szlam et al. | 379/265 |
| 5,737,726 | A | 4/1998 | Cameron et al. | 705/7 |
| 5,765,033 | A | 6/1998 | Miloslavsky | 395/200.36 |
| 5,822,744 | A | 10/1998 | Kesel | 706/52 |
| 6,154,753 | A | 11/2000 | McFarland | 707/508 |
| 6,177,932 | B1 | 1/2001 | Galdes et al. | 345/329 |
| 6,564,227 | B2 | 5/2003 | Sakakibara et al. | 707/104.1 |
| 6,662,192 | B1 | 12/2003 | Rebane | 707/104.1 |
| 6,766,319 | B1 | 7/2004 | Might | 707/4 |
| 6,786,733 | B2 | 9/2004 | Lapa et al. | 434/386 AQ |
| 2001/0047270 | A1* | 11/2001 | Gusick et al. | 705/1 |
| 2003/0163380 | A1 | 8/2003 | Vaccarelli et al. | 705/26 |

FOREIGN PATENT DOCUMENTS

WO    WO 01/57692 A1    8/2001

OTHER PUBLICATIONS

"Remedy Introduces New Applications To The Customer Relationship Management (CRM) Market" PR Newswire. New ork: Feb. 17, 1999. p. 1.*

(Continued)

*Primary Examiner*—James A Kramer
*Assistant Examiner*—Eric T Wong
(74) *Attorney, Agent, or Firm*—Fay Sharpe LLP (57) ABSTRACT

A customer satisfaction system, includes a query module for automatically sending queries to customers as to problems with goods or services provided by a provider according to a predetermined schedule and for receiving responses from customers to the queries; an analysis module for analyzing responses from customers and for sending responses indicating a problem to a problem solver for resolution; and at least one problem solver for responding to customer problems, for generating solutions to customer problems and for transmitting solutions to customers; wherein, upon transmission of a solution to a customer problem to a customer, the query module sends a query to the customer requesting verification that the problem has been solved.

20 Claims, 11 Drawing Sheets

OTHER PUBLICATIONS

Strauss, Christopher. "My Remedy what!? has been resolved???". Sep. 1998, Accessed via Internet Archive Wayback Machine <http://web.archive.org/web/19991114062001/http://www.unt.edu/benchmarks/archives/1998/september98/remedy.htm>.*

"Action Request System 4.5, Programmer's Guide". Revised Aug. 4, 2000. Glossary pp. 1-8.*

"Insurers Use Call Centers, Internet For Input. (Statistical Data Included)", Aug. 2, 1999, National Underwriter Life & Health-Financial Services Edition.*

"IUPUI NOC Problem Management/Reporting Procedures", Jan. 2002, accessed via Internet Archive Wayback Machine <www.archive.org>.*

Mark S. Ackerman, David W. McDonald, "Answer Garden 2: Merging Organizational Memory with Collaborative Help", CSCW '96, Proceedings of the ACM 1996 Conference on Computer Supported Cooperative Work, Boston, Nov. 16-20, 1996, ACM Conference on Computer Supported Cooperative Work, New York, Nov. 1996, pp. 97-105.

David A. Thurman, Jeffrey S. Tracy, Christine M. Mitchell, "Design of an Intelligent Web-Based Desk System", Systems, Man, and Cybernetics, 1997, Computational Cybernetics and Simulation, 1997, IEEE International Conference, Orlando Oct. 12-15, 1997, New York, Oct. 12, 1997, pp. 2198-2203.

* cited by examiner

CUSTOMER SATISFACTION SYSTEM AND METHOD

CROSS REFERENCE TO RELATED APPLICATIONS

This application is a continuation of copending, coassigned U.S. patent application Ser. No. 10/083,263 filed Feb. 25, 2002, to Vaccarelli et al. for "Customer Satisfaction System and Method," the contents of which are incorporated herein by reference and made a part hereof.

FIELD OF THE INVENTION

This invention relates generally to customer satisfaction systems and methods and more particularly to a customer satisfaction system and method which integrates customer satisfaction with problem resolution.

BACKGROUND OF THE INVENTION

The goal of most customer satisfaction systems is to eliminate problems and thus ensure repeat business. A customer satisfaction system typically includes customer support and some sort of feedback technique to determine if the customer support is adequate. In the typical customer support model, a customer purchases goods or services from a provider. If there is a problem with the goods or services, the customer contacts a customer service representative who works to fix the problem. Customer service may be provided via telephone support (in which a representative helps the customer solve his problem directly), or via a network connection (such as the Internet or an intranet).

Network-based support typically involves posting a list of frequently asked questions ("faqs") and providing a form for the customer to use to request support if the list of faqs does not solve his problem. The request is then transmitted to a customer support representative. The request form usually includes fields where the customer can input data describing the problem. Some network-based support includes software which can collect data from the customer's system and transmits it to customer support. Providing customer support via a network connection is desirable because it reduces costs by reducing help desk traffic, it is global in reach and is relatively easy to access. However, network-based support is frequently not as satisfactory as a telephone-based help desk.

To measure how well customer support is solving customer problems, many customer satisfaction systems rely on surveys. In some cases, a follow-up survey will be sent to the customer after the completion of a service call. Frequently, only a small percentage of customers respond, so customer service does not know if, and how well, all of the customer problems were resolved. In other cases, a generalized marketing survey may be sent to all customers in a certain demographic.

Generalized customer satisfaction marketing surveys, like most surveys, also suffer from limited customer response. Marketing surveys also generally report evaluations without specific indications for improvement, and follow a "measure and report" sequence that frequently results in delayed improvements to solve general problems identified, if any. Consequently, customers with unique or urgent problems become dissatisfied and disloyal, resulting in profit declines. Other problems with current customer satisfaction systems include: biased samples, delayed remedies, nominal guidance, constrained learning, limited usage, high costs, questionable value.

SUMMARY OF THE INVENTION

A customer problem is the difference between the customer's expectation and the provider's or the product's performance. Total customer satisfaction can be achieved by the elimination of customer problems. A method for ensuring customer satisfaction, includes automatically sending, according to a predetermined schedule, a query to a customer as to problems with goods or services provided by a provider to the customer, receiving a response from a customer to the query, analyzing the response received from the customer to determine if the customer has a problem, if the response indicates the customer has a problem, generating a solution to the problem, transmitting the solution to the customer and sending a query to the customer requesting verification that the problem has been solved by the solution.

A customer satisfaction system, according to the invention, includes a query module for automatically sending queries to customers as to problems with goods or services provided by a provider according to a predetermined schedule and for receiving responses from customers to the queries; an analysis module for analyzing responses from customers and for sending responses indicating a problem to a problem solver for resolution; and at least one problem solver for responding to customer problems, for generating solutions to customer problems and for transmitting solutions to customers; wherein, upon transmission of a solution to a customer problem to a customer, the query module sends a query to the customer requesting verification that the problem has been solved.

Any means of communication may be used to send queries, responses, solutions, verification. In one embodiment, email is used. Email is ubiquitous and instantaneous; email may be sent over the Internet or a local intranet. Queries are sent on a predetermined schedule to customers. All customers may receive queries. The predetermined schedule may be once a month, once a week, or any other appropriate time interval with follow-ups for verification that a problem has been solved being sent more frequently, on the same schedule or according to any other schedule. By using a frequent query (which may be an online survey or an offline survey) of all customers of a particular demographic, the customer satisfaction method follows a "sense and respond" sequence, immediately conveying specific problems of individual customers to designated problem solvers until the customers confirm the problems are solved, then reporting problems conveyed along with solutions implemented. Customer satisfaction is assured as well as measured, supporting profits and organizational learning.

DETAILED DESCRIPTION OF THE EMBODIMENTS

Figure 1:
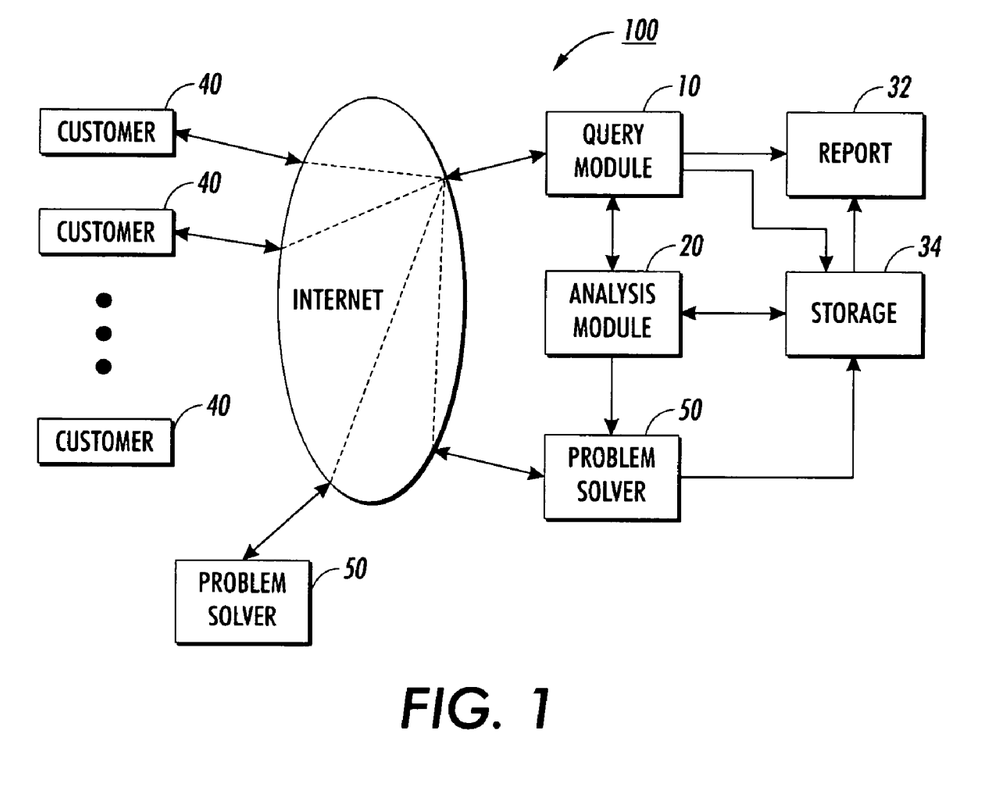
FIG. 1 is a block diagram of a customer satisfaction system.

A customer problem is the difference between the customer's expectation and the provider's or the product's performance. Total customer satisfaction can be achieved by the elimination of customer problems. An exemplary customer satisfaction system is shown in FIG. 1 and referred to by reference numeral 100. System 100 includes query module 10, analysis module 20, storage 34, report generating module 32, and one or more problem solvers 50. In this embodiment, the customer satisfaction system 100 communicates with customers 40 via the Internet. Alternatively, the customer satisfaction system 100 could be installed on a local intranet, for example, if a business unit such as the information technology group wished to measure satisfaction of its internal corporate customers. In system 100, query module communicates with customers using email.

Query module 10 automatically sends out queries in the form of an email to customers according to a predetermined schedule. The predetermined schedule may be any period, such as weekly (for new accounts), monthly (for established accounts), every fifteen days, etc. The query asks the customer if they have any problems. Query module 10 receives responses from customers which are then sent to the analysis module 20. Analysis module 20 determines if a customer has a problem. If the customer has a problem, the analysis module 20 sends the problem to an appropriate problem solver 50. The problem solver is responsible for finding a solution to the customer's problem. The problem solver may be requested to commit to a particular date for problem solution, which date may be transmitted to the customer. When the problem solver has a solution, the problem solver sends the solution to the analysis module, which records the solution and time of completion. The analysis module then sends the solution to the query module which sends it to the customer. Alternatively, the problem solver could transmit the solution directly to the customer, with a copy to the analysis module for tracking.

The analysis module 20 schedules a follow up to be sent by the query module 10 to the customer to verify that the solution has been sent if the problem solver transmitted it directly and if the solution solved the customer's problem. If the customer responds that the problem has not been solved or portions still remain unsolved, the query module forwards the follow up response to the analysis module, which forwards it to the problem solver for further solution. The customer satisfaction system may be implemented using standard helpdesk type software, uniquely modified to periodically contact product or service users, gather, record, and route problems immediately to designated problem solvers, register their commitment to a solution date, confirm their solution on that date; and then verify solution with the user reporting the problem.

System 100 includes storage 34 for storing a record of all queries, customer responses, solutions, follow up, verifications and any other information appropriate to the customer. From storage 34, system 100 can generate reports in report generator 32 of customer problems, solutions, time of resolution and other information pertinent to the customer. Information stored in storage 34 can be used by other organizations in the provider. For example, an engineering group could search the problems in storage 34 for similarities, identifying possible problems in a particular area of the product. Management could use the stored information to verify that problem solvers are working effectively, to identify needs for new or different types of problem solvers.

Figure 2:
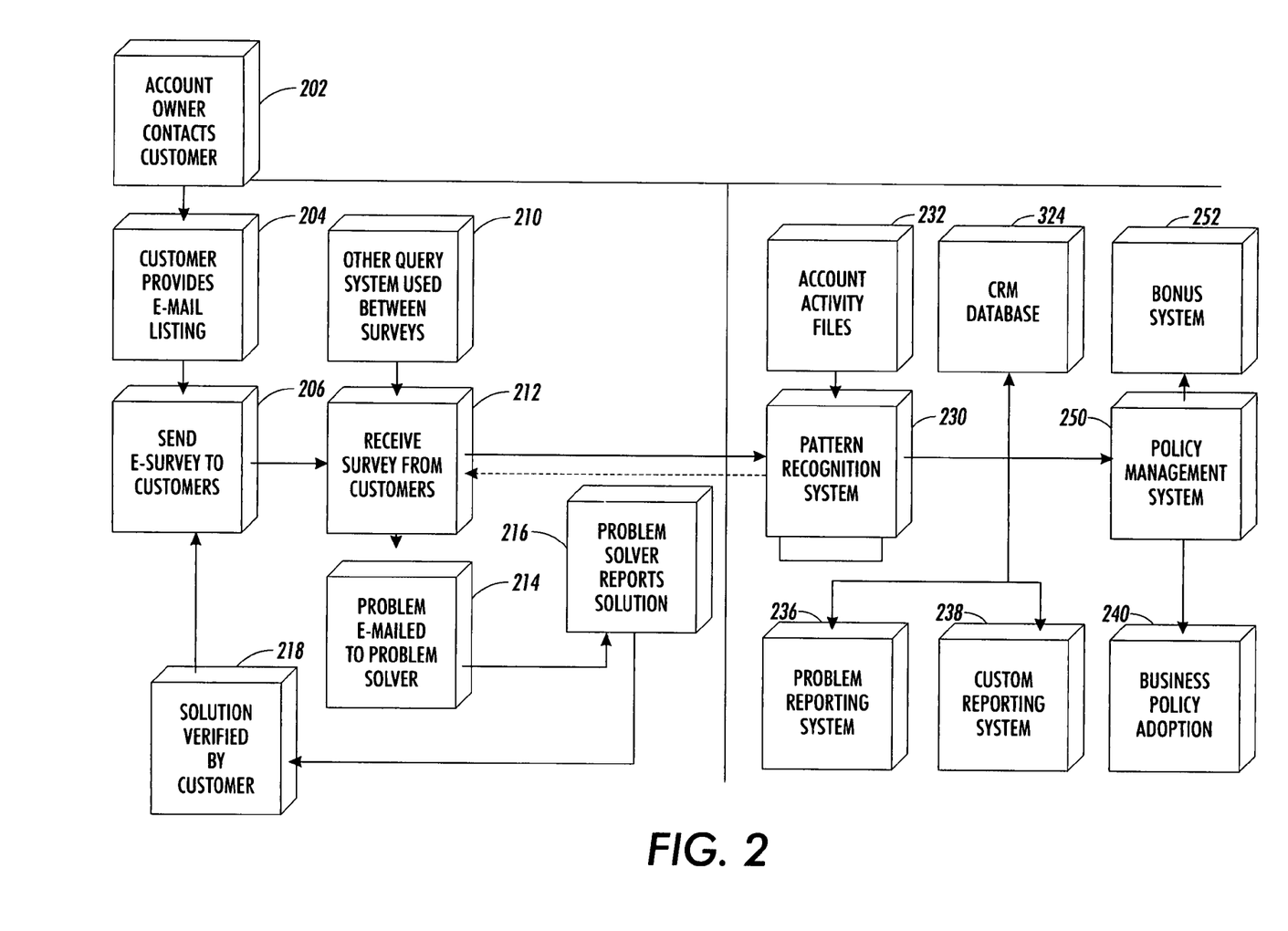
FIG. 2 is a block diagram illustrating a method of providing customer satisfaction.
Figure 3:
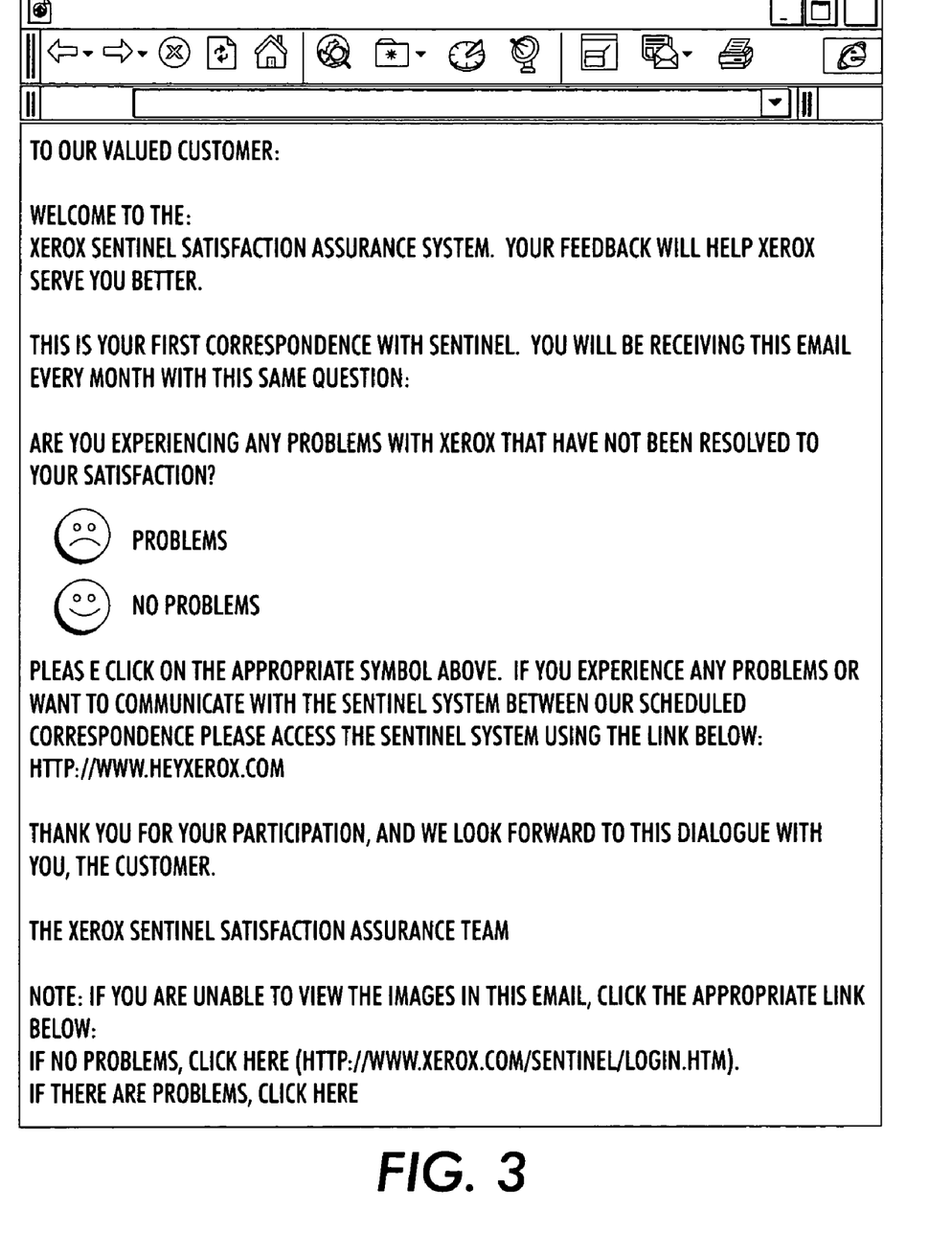
FIG. 3 is an exemplary query sent via email to a customer.
Figure 6:
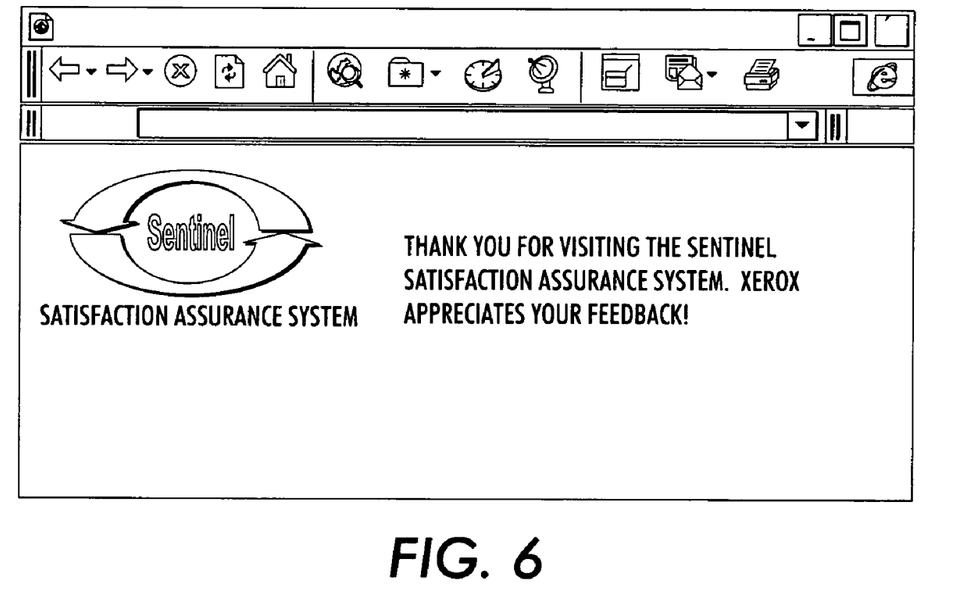
FIG. 6 is an exemplary thank you page.

A method of ensuring customer satisfaction is shown in FIG. 2. In step 202, an account representative or owner contacts the customer to ask if the customer wants to participate in the customer satisfaction system. Depending on the owner of the customer satisfaction system, participation may be voluntary or not. In step 204, the customer must provide an email address where he/she may be contacted. In step 206, the provider sends an email survey to the customer. It is anticipated that in most cases, all customers will be sent email surveys. FIG. 3 is an exemplary initial email survey. This survey provides a simple yes or no response (by clicking on the happy or unhappy face icon). If the customer clicks on the no problems icon, that response is sent to the provider (step 212) and a thank you screen is presented to the customer (see FIG. 6).

Figure 4:
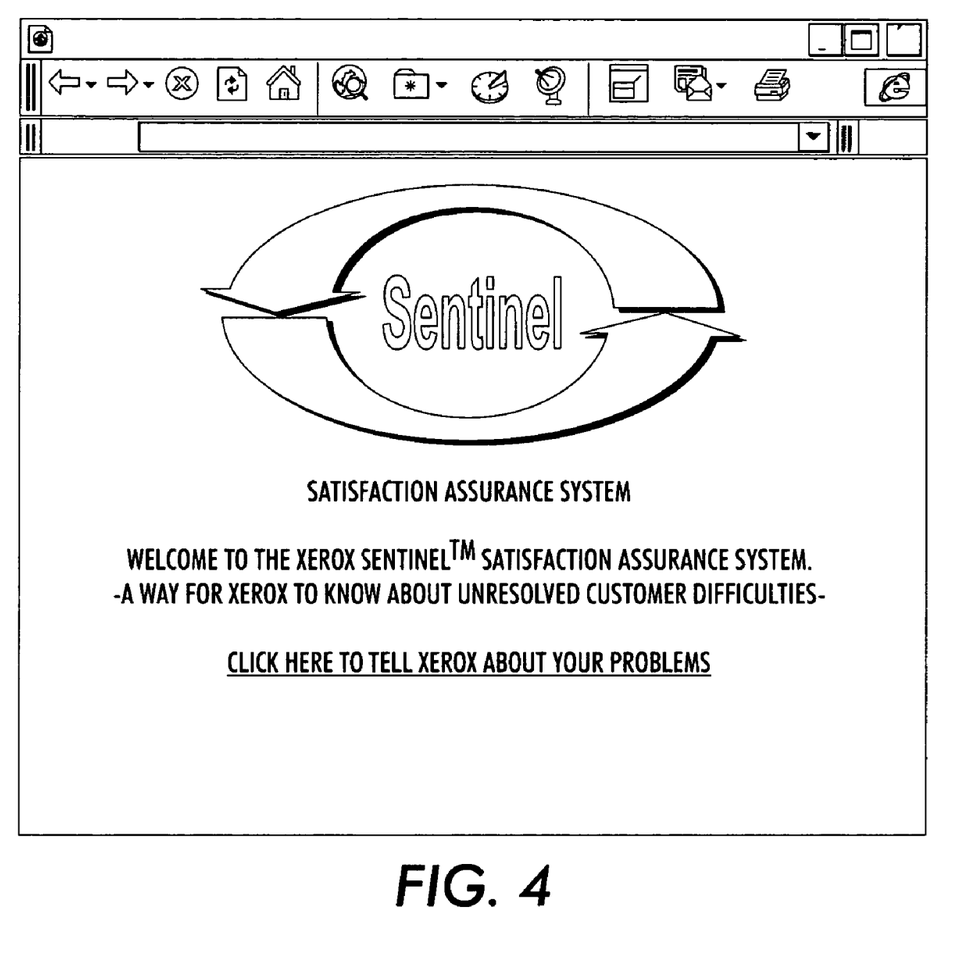
FIG. 4 is an exemplary entrance screen to a customer satisfaction system.
Figure 5:
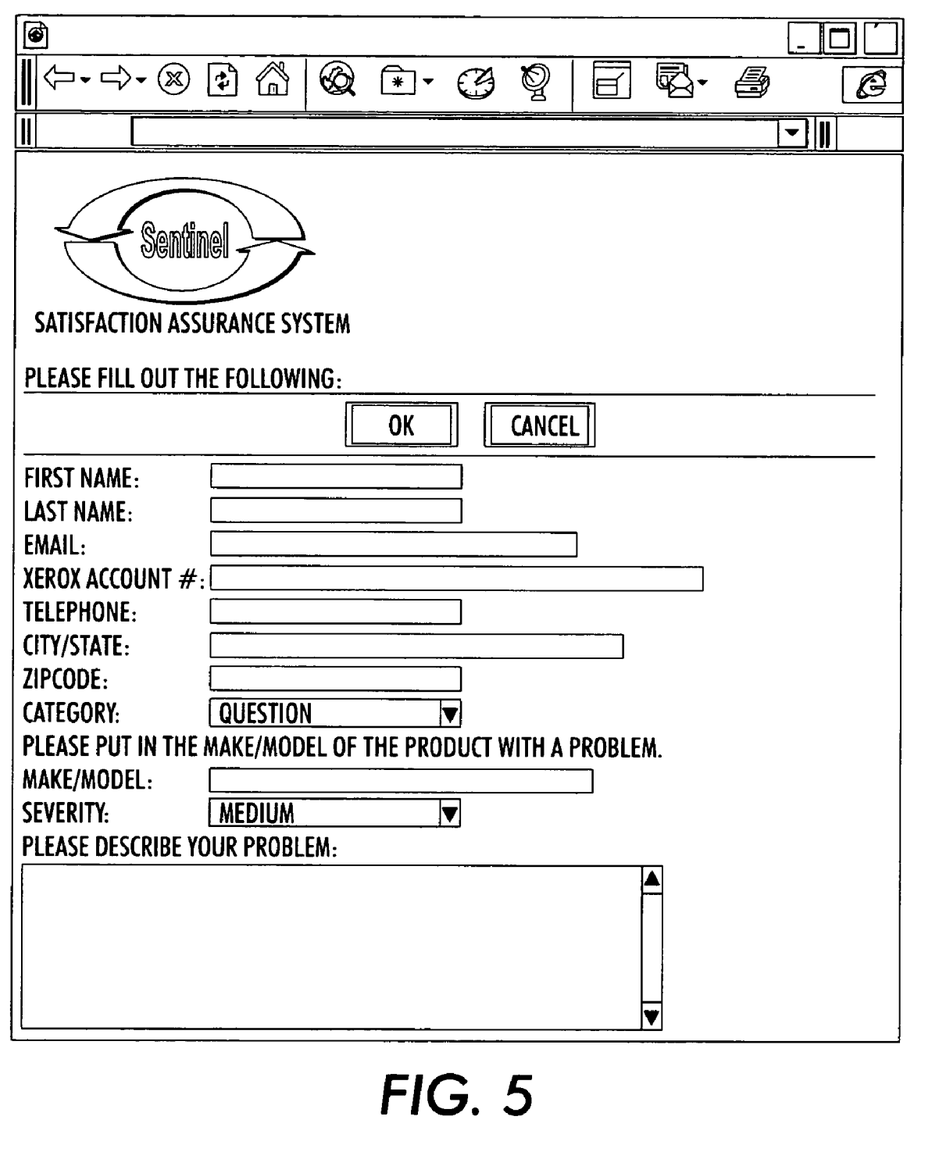
FIG. 5 is an exemplary customer survey screen.

The email survey shown in FIG. 3 has html links so that the customer can go directly to online help, by clicking the http://www.heyxerox.com link. If the customer has a problem and clicks on the problems icon, the customer is presented with a welcome screen as shown in FIG. 4. Alternatively, if the customer clicks on the http://www.heyxerox.com link, the same screen may be presented. This link may be used by the customer at any time, not just in response to a query (step 210). The customer clicks on the "Click here to tell Xerox about your problem" link and the survey form shown in FIG. 5 is displayed. This survey requests the customer to fill out information: name, address, email, account number, category of problem, make/model of product, severity of problem and a description in the customer's own words of the problem. When the customer completes the form and clicks on the ok button, the thank you screen (FIG. 6) is displayed.

Figure 7:
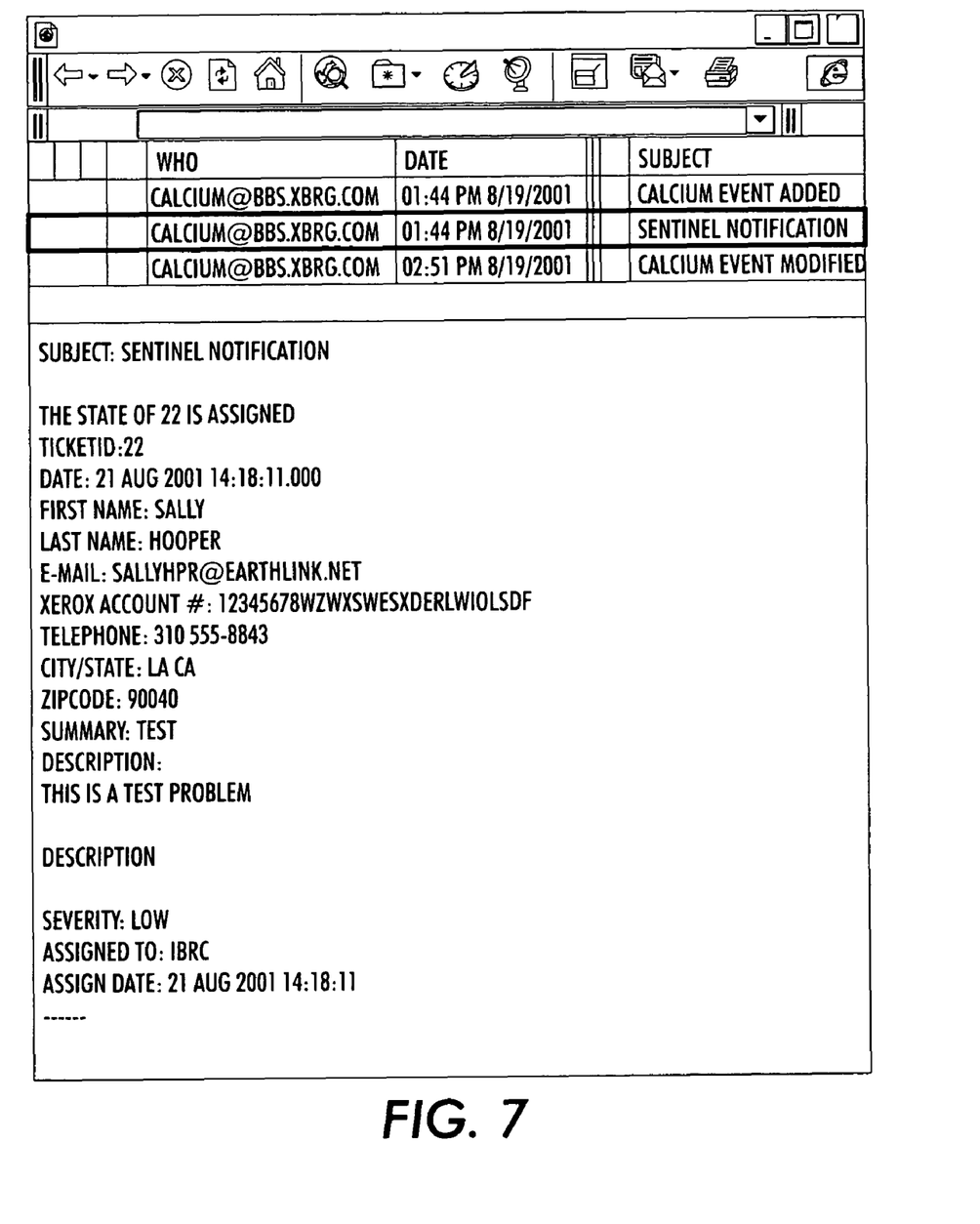
FIG. 7 is an exemplary notification to a problem solver.

In step 214, the customer's problem is routed via email to a problem solver. FIG. 7 is an exemplary email transmitting a customer problem to a designated problem solver, which contains the date and description of the customer's problem. When the problem solver solves the problem, the problem is reported (step 216) both to the user and to the provider. In step 218 the solution is verified by the customer.

Figure 8:
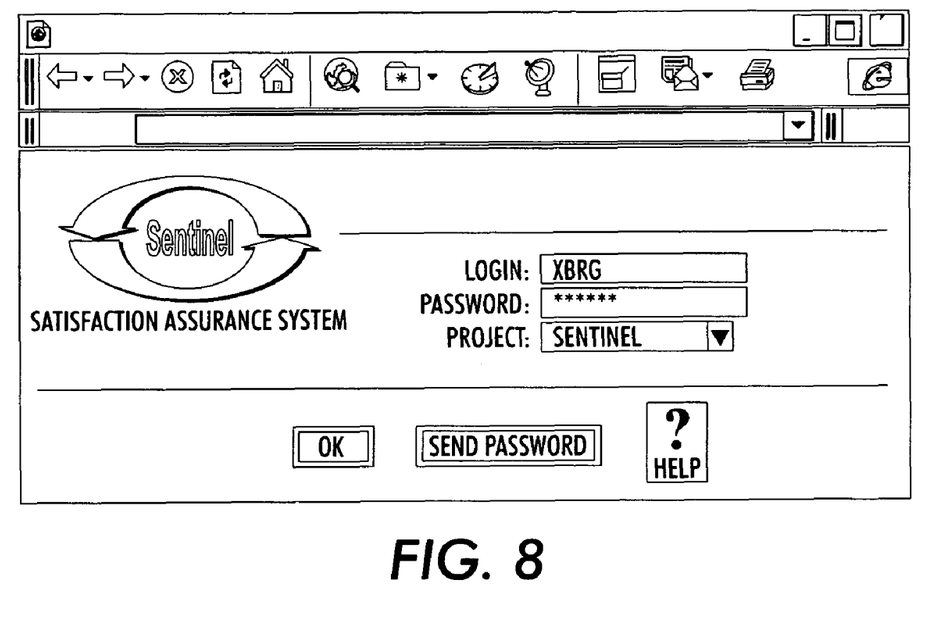
FIG. 8 is an exemplary login page for a problem solver.
Figure 9:
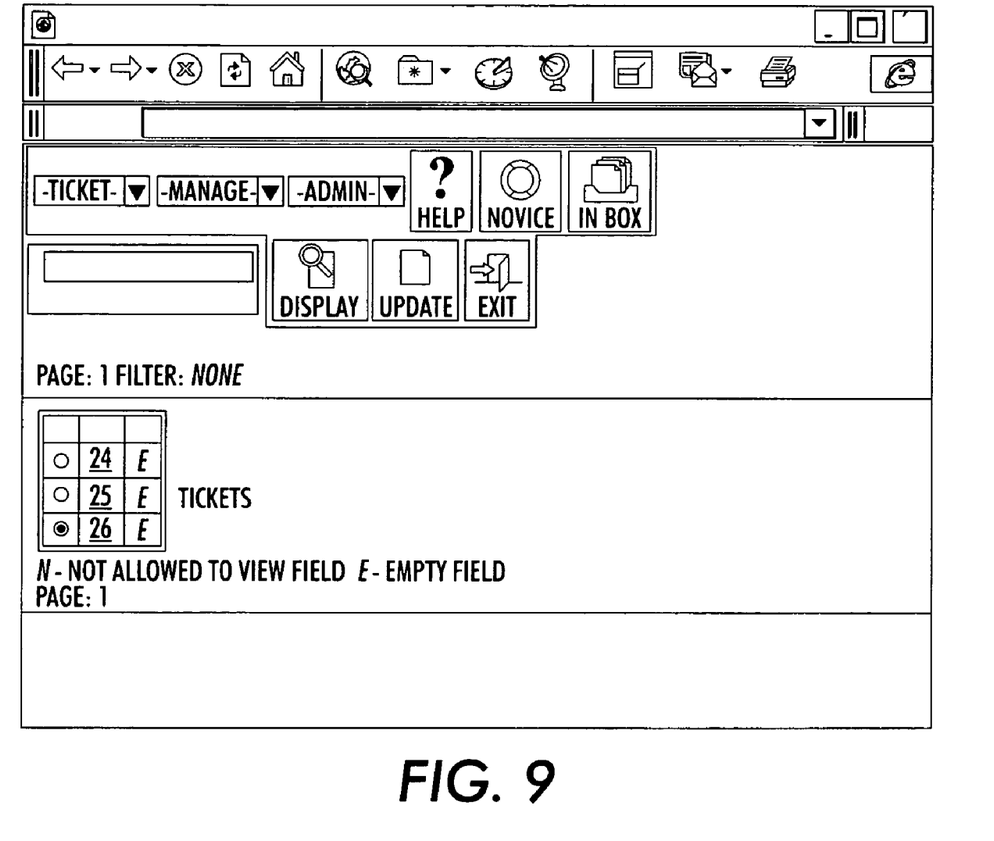
FIG. 9 is an exemplary problem solver entrance screen.

Most problem solvers will have many problems on their "docket" to solve. To facilitate communication and follow up on the customer satisfaction system, each problem solver is provided with an online account in which the system and problem solver can track progress on solutions. When a problem solver enters the system, an opening screen, such as shown on FIG. 8, is displayed. The problem solver must enter a login name and password. After clicking on the ok button, a problem solver entrance page is displayed as shown in FIG. 9. This page lists the number of tickets (i.e., customer problems) outstanding as well as other administrative items. For example, a search box is provided so the problem solver can search for various items, such as tickets having the same keyword, call up a particular ticket, etc.

Figure 10:
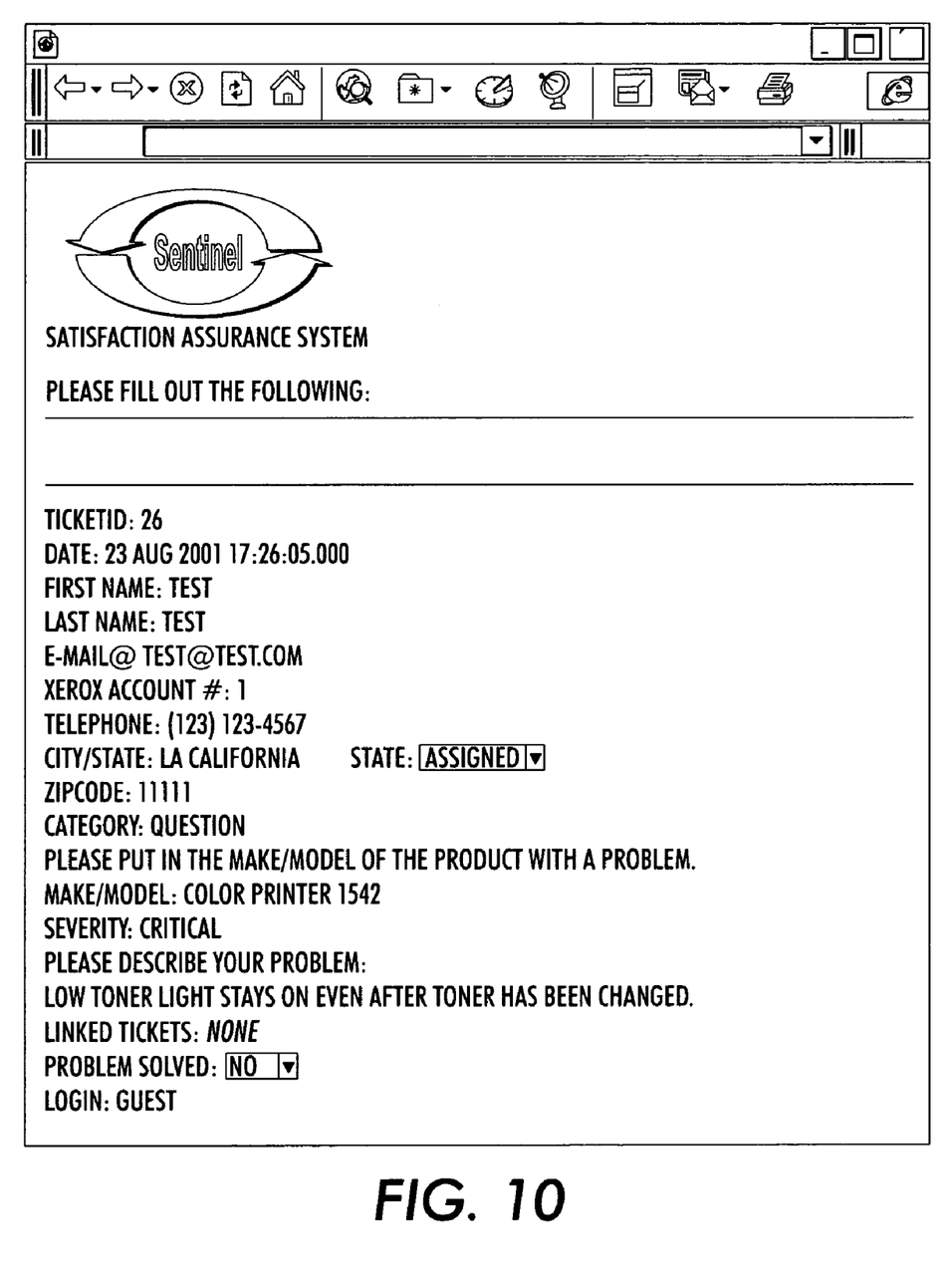
FIGS. 10 and 11 are an exemplary problem solver ticket update page.
Figure 11:
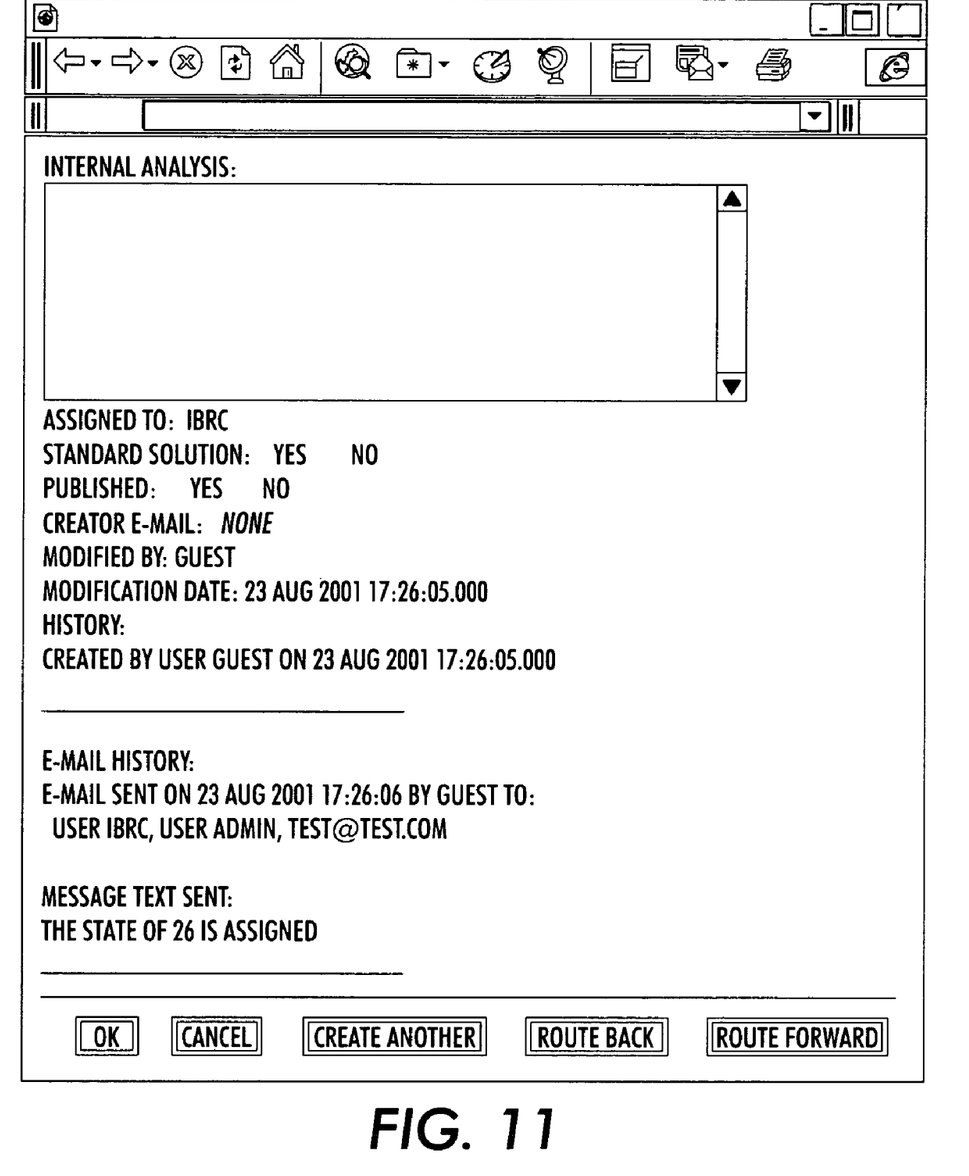

FIGS. 10 and 11 show a problem solver ticket update page for the problem reported in FIG. 5. This update page provides fields for the problem solver to track the problem, its progress, internal analysis, history of correspondence, etc. When the problem solver receives a new problem, a problem solver ticket is created. When the problem solver has solved the problem, he will enter the system and click yes to problem solved. This will generate an email to the customer stating that original problem, the problem solver's solution and asking if the problem is now solved, yes or no. If the customer responds yes, the ticket is closed. If the customer responds no, the system will generate a new ticket with all the previous information attached and sends the ticket to the problem solver.

Referring again to FIG. 2, when customer surveys are received (step 214), these surveys can be used by the service or product provider for various purposes. The surveys may be used, for example, as an input to another system of information generation. For example, the customer surveys can be sent to a pattern recognition system 230 which can be used to select the particular problem solver to send the problem. However, the pattern recognition system can also use the customer survey information as input to a policy management system 250, which provides input to a bonus system 252 and to a business policy adoption system 240. Account activity files 232 can also be used as input to the pattern recognition system 230. Survey information can also be input to a customer relations management (CRM) database 324, a problem reporting system 236 and a custom reporting system 238.

The customer satisfaction system ensures customer satisfaction by first identifying problems, solving the customer problems and having the customer verify that the problem has been solved. In addition to providing customer satisfaction, the customer satisfaction system offers the product and service provider a large amount of data which can be used to further the provider's business. Information outputs of the customer satisfaction system can be used to generate summary indexes of satisfaction; problem prevalence and profiling; problem solver performance; problem clustering. For example, summary indexes of problems can be compared by problem type, by account, by entity, by product. Problem solver performance can be compared (e.g., the percentage of reported problems solved by each problem solver). Problems can be analyzed for prevalence based on problem characteristics. Additionally, the information from the customer satisfaction system can be used for problem valuation; solution validation; pattern insights. For example, solution validation can be used to determine the average revenue among accounts reporting problems solved. It is anticipated that with problems being solved, revenue would increase due to increased customer satisfaction.

Solutions to problems may be logged and analyzed for organizational learning. A direct link may be made from the customer to the account team without any filters. The account team will be able to have a direct effect on customer satisfaction. The customer satisfaction system ensures satisfied customers; generates learning through direct contact; fosters revenue; encourages use of the information; maximizes the value of the information; minimizes costs through automation, enhances the provider's image, and provide renewed employee (provider) morale.

Periodically, customers are surveyed and asked if they have any problems with the sponsoring vendor. If not, they are recorded as satisfied. If no, they are asked to openly describe their problem. Each problem description is then conveyed to a designated problem solver, who responds until the problem is reported solved by the customer in a follow-up survey. Conveyed problems and specified solutions are then reported by the system to the product or service provides, on a standard or customized basis. Recurring patterns may be recognized to suggest fundamental policy improvements.

Problems may be codes as to type (and other categories). Both problems and customer responses may be analyzed by a pattern recognition system (such as one employing a neural net model) to suggest proven solutions to problem solvers, and to identify patterns that should suggest preventative improvements in fundamental policies; procedures; organizational actions; technology investments; marketing strategies; etc.

The customer satisfaction system provides the unique ability to materially prove to customers its determination to ensure any reported problems will be documented and resolved rapidly, consistently, and systematically to their satisfaction; and that recurring problems will be recognized and eliminated by prevention. This unique ability should increase customer confidence in the provider, loyalty to the provider and resulting in improved profits for the provider.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A customer satisfaction system for allowing a provider of goods or services to discover problems reported by a plurality of customers of a provider and transform the problems into suggested solutions, comprising:
    a storage database contained within a computer operable memory; and
    a computer processor configured to:
        automatically send to customers, over a communications network, according to a predetermined query schedule, open-ended queries asking if customers have any problems with goods or services provided by the provider, wherein the query schedule comprises weekly queries for new clients, and monthly queries for established accounts;
        receive responses, from customers to the queries via the communications network;
        analyze responses from customers in order to identify customer problems,
        commit to a particular date for presenting a solution to the customer problem;
        send responses with identified customer problems, over the communications network, to a problem solver for resolution,
        receive solutions from problem solvers via the communications network,
        upon receipt of a solution to an identified problem from a problem solver, send, via the communications network, a request for verification that the identified problem has been solved;
        maintain a status for the identified customer problem as unsolved until receipt of verification from the customer that indicates the identified customer problem has been solved;
    change the status to resolved when the customer verifies that the customer problem has been resolved; and
    store, in the storage database, queries sent to customers, responses received from customers and solutions generated by problem solvers wherein the provider can access the storage database to identify problems identified by customers and solutions provided by problem solvers.

2. The customer satisfaction system of claim 1, further comprising a report generator module, wherein the report generator module is generates a report containing at least one of queries sent, responses received, problems identified and solutions generated.

3. The customer satisfaction system of claim 1, wherein a query sent to a customer from the query module includes a survey having an interactive icon comprised of an unhappy face for problems and an interactive icon comprised of a happy face for no problems.

4. The customer satisfaction system of claim 3, wherein responsive to a customer interaction with the interactive icon for problems, the query module sends a customer survey to the customer, wherein the customer survey includes spaces for the customer to type or write by hand text characters which describe a problem.

5. The customer satisfaction system of claim 1, wherein the analysis module includes a pattern recognition system for analyzing customer problems and for providing input from which at least one employee bonuses may be calculated.

6. The customer satisfaction system of claim 1, wherein an identified problem sent to a problem solver from the analysis module includes information describing the identified problem and information which indicates the priority with which the problem should be addressed.

7. The customer satisfaction system of claim 1, further comprising a problem solver module, wherein the problem solver module is configured to display, for each assigned problem solver, a problem solver list comprising a listing of all identified problems, the priority with which the problem should be solved, and their status to the assigned problem solver.

8. The customer satisfaction system of claim 7, wherein the problem solver module is further configured to display a problem ticket update page, wherein the update page includes spaces for the problem solver to input solution information.

9. A method for allowing a provider of goods or services to sense and respond to problems from a plurality of customers of the provider over a communications network, comprising:
   automatically sending to customers, over a communications network, according to a predetermined schedule, open-ended queries asking if customers have any problems with goods or services provided by the provider;
   receiving responses from customers, via the communications network, to the queries;
   analyzing responses from customers using a computer processor to identify customer problems;
   committing to a date by which the problem may be resolved based on similar responses from previous customers currently stored in a computer operable database memory;
   sending responses with identified customer problems, over the communications network, to problem solvers for resolution;
   receiving solutions from problem solvers via the communications network;
   upon receipt of a solution to an identified problem from a problem solver, sending to the customer, via the communications network, a request for verification that the identified problem has been solved;
   maintaining the status for the identified customer problem as unsolved until receipt of verification from the customer that the identified customer problem has been solved; and
   storing queries sent to customers, responses received from customers and solutions generated by problem solvers in a storage database contained within a computer memory wherein the provider can access the storage database to identify problems identified by customers and solutions provided by problem solvers.

10. The method of claim 9, further comprising generating a report of queries sent, responses received, problems identified and solutions generated.

11. The method of claim 9, wherein a query sent to a customer includes an interactive icon for problems and an interactive icon for no problems.

12. The method of claim 11, wherein responsive to a customer interaction with the interactive icon for problems, sending a customer survey to the customer, wherein the customer survey includes spaces for the customer to describe a problem.

13. The method of claim 9, wherein the analysis step includes using a pattern recognition system for analyzing customer problems.

14. The method of claim 9, wherein an identified problem sent to a problem solver includes information describing the identified problem and priority information.

15. The method of claim 9, further comprising displaying, for each assigned problem solver, a problem solver docket comprising a listing of all identified problems and their status to the assigned problem solver.

16. The method of claim 15, further comprising displaying, for the assigned problem solver, a problem ticket update page, wherein the update page includes spaces for the problem solver to input solution information.

17. The method of claim 9, wherein the communications network comprises the Internet.

18. The method of claim 9, wherein the communications network comprises an intranet.

19. The method of claim 9, further comprising a summary index of problems compared by at least one of problem type, by account, by entity, by product, by percentage of problems solved, and by problem characteristics.

20. A computer operable method for allowing a provider of goods or services to detect problems from a plurality of customers of the provider over a communications network and transform the problems into problem solutions based on a similarity to previously encountered customer problems, comprising:
   automatically sending, over a computer operable communications network, according to a predetermined schedule, open-ended queries to customers asking if customers have any problems with goods or services provided by the provider, wherein the schedule comprises weekly queries for new clients, and monthly queries for established accounts;
   receiving responses, via the communications network, from customers to the queries;
   analyzing responses from customers using a computer processor to identify customer problems, wherein the analysis includes analyzing a response from a customer which includes interaction with an interactive computer displayed graphical user interface icon of an unhappy face for problems and an interactive icon of a happy face for no problems;
   committing to a particular date for presenting a solution to the customer problem by sending the date to the customer;
   sending responses with identified customer problems, over the communications network, to problem solvers for resolution;
   receiving solutions from problem solvers via the communications network;
   upon receipt of a solution to an identified problem from a problem solver, sending to the customer, via the communications network, a request for verification that the identified problem has been solved, and maintaining the status for the identified customer problem as unsolved until receipt of verification from the customer that the identified customer problem has been solved; and
   storing queries sent to customers which includes an interactive icon for problems and an interactive icon for no problems, responses received from customers and solutions generated by problem solvers in a storage database residing in a computer memory, wherein the responses received from customers contain descriptions of problems, wherein a description of a problem is obtained from a customer by sending a survey to the customer in response to the customer interacting with the icon for problems, wherein the survey includes space for the customer to describe the problem.

* * * * *